Feb. 20, 1951     C. A. BEDFORD     2,542,857

WORK-HOLDING CHUCK

Filed Oct. 29, 1949

INVENTOR
C. A. BEDFORD
BY Joseph K. Schofield
ATTORNEY

Patented Feb. 20, 1951

2,542,857

UNITED STATES PATENT OFFICE 2,542,857

WORK HOLDING CHUCK

Cecil A. Bedford, Plainville, Conn., assignor to Union Manufacturing Company, New Britain, Conn., a corporation of Connecticut Application October 29, 1949, Serial No. 124,471

4 Claims. (Cl. 279—116)

1

This invention relates to work holding chucks and more particularly to a chuck of this type adapted for mounting on the rotatable spindle of a machine tool.

A primary object of the present invention is to provide a light weight chuck of rugged construction and adapted for heavy duty at high spindle speeds.

A feature that enables the above object to be accomplished is that a hub member is made of steel or other metal resistant to wear and having the necessary tensile strength, this hub member having a body member rigidly secured thereto formed of lighter weight material.

Another important feature of the invention is that the hub member and body member are bonded one to the other by casting the body member around the hub, the surfaces of the hub in contact with the body member being non-circular in cross section so that a positive drive is provided from the hub to the chuck body and operating part of the chuck.

With the above and other objects in view the invention may include the features of construction and operation set forth in the following specification and illustrated in the accompanying drawing.

In the accompanying drawing annexed hereto and forming a part of this specification, I have shown the invention embodied in a work holding chuck adapted primarily for engine lathes but it will be understood that the invention can be otherwise embodied and that the drawing is not to be construed as defining or limiting the scope of the invention, the claims appended to this specification being relied upon for that purpose.

In the above mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts:

2

First, a hub member provided with spindle attaching means of any desired or standard type; second, a body member of light metal or composition intimately bonded to the hub member for rotation therewith; third, a front plate member secured to the body member; fourth, work clamping jaws slidably mounted for radial movement within the front plate member; and fifth, jaw actuating means housed within the body member.

Figure 3:
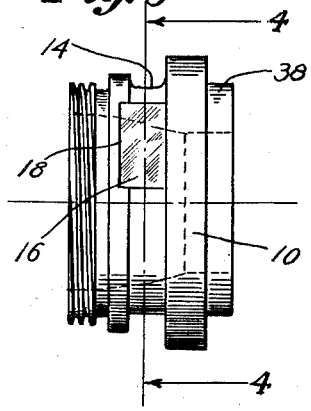
Fig. 3 is a side elevation of one of the members forming the chuck.

Referring more in detail to the figures of the drawing, there is shown at 10 a hub member preferably made of steel or other high tensile strength material and provided at one end with attaching means 12 to a spindle or other rotative member of a machine tool (not shown). The attaching means shown in the figures of the drawing are in the form of screw threads adapted to engage corresponding screw threads on the spindle or other rotative member of a machine tool on which the chuck is mounted. It will be understood, however, that any standard form of adaptor may be used with the hub member. The hub member 10 also is provided with internal conical surfaces to properly mount the chuck coaxially on its spindle so that there will be no appreciable run-out at high speeds. On its outer surface the hub member is provided with a peripheral groove 14 portions of which 16 are flattened to provide a non-circular transverse section. Also portions of the groove 14 may be widened at spaced portions about the periphery as shown in Fig. 3 at 18.

Intimately bonded to the hub member 10 is a body member 20 preferably cast or moulded in position directly against the non-circular surfaces of the groove 14 in the hub member 10. The hub 10 may be first completely or partially machined and then placed in a mould for the chuck body 20 and the metal for the body member may be poured into the mould and against the outer surfaces of the hub member 10 the cylindrical portions of which are concentric with the mounting surfaces. As the hub 10 is preferably of steel and the body member 20 is of light metal such as aluminum or an alloy thereof, the metal of the body member 20 having a greater coefficient of expansion will on cooling within the mould be contracted to closely engage the hub surfaces. By reason of the flattened portions 16 of the groove 14 and its widened sections 18 the body member 20 will be prevented from rotating relative to the hub member 10.

To the forward portion of the body member 20 is attached as by screws 22 at the chuck periphery a front plate 24 of sufficient thickness to provide radially extending ways within which may operate chuck jaws 26 of any usual or standard type. This front plate 24 may be of steel or other wear resistant metal having high tensile strength. To lighten the chuck as much as possible the front plate may have its rear surface milled out as shown at 28 to remove metal where not essential to provide supporting means for the jaws 26.

The front plate 24 is annular in form to provide an axial hole extending through the chuck. At the inner periphery of the front plate 24 screws 30 may be provided to securely attach the front plate 24 to the forward end of the hub member 10. Within the body member 20 are housed one or more pinions 32 meshing with gear teeth 34 on the rear face of the jaw actuating scroll member 36. As the means for operating the scroll member 36 and moving the jaws 26 may be of any standard form and form no part of the present invention further description of these parts is not thought to be necessary.

The hub member 10, the body member 20 and the annular front plate 24 form a substantially rigid unit having the required strength. With the hub 10 and front plate 24 of steel all parts having wearing surfaces and requiring high tensile strength are of the same material as in conventional chucks. By the provision of a light weight material for one of the principal members, the body member 20 of the chuck which does not have wearing surfaces, the weight of the complete chuck is reduced materially without reducing its durability. Also as the major portions of the body member 20 are of light weight material and are at appreciable distances from the axis of rotation of the chuck the inertia of the chuck during rotation is greatly reduced.

Figure 1:
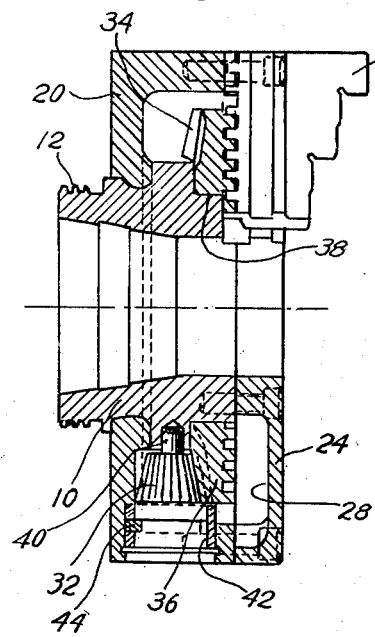
Fig. 1 is a side elevation in section of a chuck made in accordance with the present invention.
Figure 2:
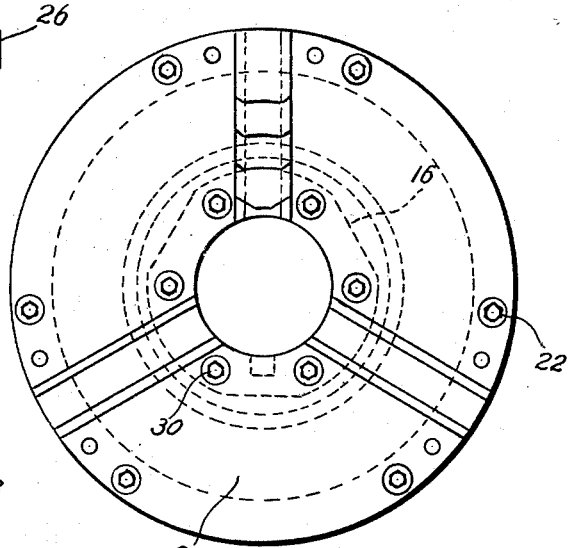
Fig. 2 is a front elevation of the chuck shown in Fig. 1.
Figure 4:
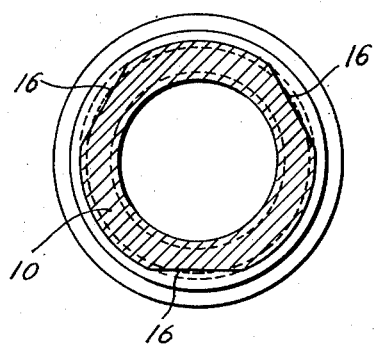
Fig. 4 is a sectional view taken on the plane of line 4—4 in Fig. 3.

By an inspection of Fig. 1 it will be seen that the forward end of the hub member 10 forms the bearing surface 38 for the jaw operating member 36. As this surface 38 will be formed concentric with the conical surfaces for mounting the chuck on its spindle during the machining of the hub the surface 38 will be concentric with the axis of rotation of the chuck and will form a wear resisting bearing surface for member 36. The inner end of each pinion 32 for operating member 36 and chuck jaws 26 may be provided with a cylindrical projection 40 supported as shown within a suitable radial hole directly in the hub 10. The outer end of the pinion 32 which extends into the body member 20 preferably is supported by means of a steel bushing 42 pressed firmly into the metal of the body member 20. A split retainer ring 44, expanded within the bushing 42, and engaging against the outer face of the pinion 32, may be used to prevent accidental removal of the pinion from its operative position in the usual manner.

I claim as my invention:

1. A chuck comprising in combination, a hub member having means to attach the chuck coaxially to a spindle, said hub member having a peripheral groove formed therein, a body member cast to said hub member and engaging said groove, a front plate attached to said hub member and body member, radially movable jaws in said front plate, and a jaw operating scroll rotatably mounted coaxially on said hub member and housed within said body member.

2. A chuck comprising in combination, a hub member having means to attach the chuck coaxially to a spindle, said hub member having a peripheral groove formed therein, a body member cast to said hub member and engaging said groove, a front plate attached to said hub member and body member, radially movable jaws in said front plate, a jaw operating scroll rotatably mounted coaxially on said hub member and housed within said body member, and a scroll operating pinion having its inner end supported within said hub member and its outer end supported within said body member.

3. A chuck comprising in combination, a hub member having centering and attaching means for mounting said chuck on a spindle, said hub member having a peripheral groove formed therein, said groove having flattened portions formed therein, a body member cast around said hub and closely fitting the surfaces of said groove, a front plate attached to said hub and body member, radially movable jaws in said front plate, a jaw operating scroll rotatably mounted on a cylindrical projection on said hub member, gear teeth on the rear face of said scroll and a radially disposed bevel pinion engaging said gear teeth, said pinion having its inner end supported within said hub member and its outer end supported within said body member.

4. A chuck comprising in combination, a hub member having centering and attaching means for mounting said chuck on a spindle, said hub member having a peripheral groove formed therein, said groove having flattened portions formed therein, a body member cast around said hub and closely fitting the surfaces of said groove, a front plate attached to said hub and body member, radially movable jaws in said front plate, a jaw operating scroll rotatably mounted on a cylindrical projection on said hub member, gear teeth on the rear face of said scroll, a radially disposed bevel pinion engaging said gear teeth, said pinion having its inner end supported within said hub member, the outer end of said pinion having an annular grove formed therein, a sleeve in said body member into which the outer end of said pinion extends, and a locking ring fitting within said sleeve and entering the groove in said pinion.

CECIL A. BEDFORD.

REFERENCES CITED

The following references are of record in the file of this patent:

UNITED STATES PATENTS

| Number | Name | Date |
|---|---|---|
| 130,880 | Strong | Aug. 27, 1872 |
| 1,007,132 | Miller | Oct. 31, 1911 |
| 1,046,523 | Whiton | Dec. 10, 1912 |
| 1,713,801 | Whiton | May 21, 1929 |
| 1,794,511 | Bush | Mar. 3, 1931 |
| 2,213,653 | Lebron | Sept. 3, 1940 |